United States Patent Office 3,743,747
Patented July 3, 1973

3,743,747
OXO-DERIVATIVES OF LIMONENE AND DIPENTENE USED AS FUNGICIDES
Darrell D. Whitehurst, Titusville, N.J., assignor to Mobil Oil Corporation
No Drawing. Filed June 14, 1971, Ser. No. 153,070
Int. Cl. A01m 9/24
U.S. Cl. 424—333                                3 Claims

ABSTRACT OF THE DISCLOSURE

Certain oxo-derivatives of limonene and dipentene form a new class of compounds exhibiting fungicidal activity. In standard fungicide tests, the compounds of this invention prove effective against *Fusarium oxysporium*, *Pythium debaryanum*, *Rhizoctonia solani* and *Sclerotium rolfsii*.

BACKGROUND OF THE INVENTION

Field of the invention

This invention is directed to the use of certain oxo-derivatives of limonene and dipentene as fungicides.

DESCRIPTION OF THE PRIOR ART

U.S. Pat. No. 2,556,150 discloses butyl alcohol derivatives, such as, in particular, alkylcyclohexenyl butanols and alkylcyclohexyl butanols and their esters as compounds having sweet, persistent odors which permit their use as components of perfumes and related products.

No reference to the compounds of the present invention as pesticides, i.e., fungicides, are known to the applicant.

SUMMARY OF THE INVENTION

This invention provides for use as fungicides compounds having the formula:

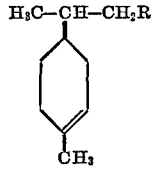

wherein R is a member selected from the group consisting of —$CH_2OH$ and —CHO; and fungicidally effective compositions containing at least one such compound and a carrier therefor.

DESCRIPTION OF SPECIFIC EMBODIMENTS

As will be noted from the above formula, the compounds of this invention for use as fungicides are certain oxo-derivatives of limonene and dipentene. Examples of such compounds embodied for use in this invention include the following and mixtures thereof:

d-beta-(4-methyl-$\Delta^3$-cyclohexenyl) butyraldehyde,
d-beta-(4-methyl-$\Delta^3$-cyclohexenyl) butanol,
l-beta-(4-methyl-$\Delta^3$-cyclohexenyl) butyraldehyde, and
l-beta-(4-methyl-$^3\Delta$-cyclohexenyl) butanol.

The compounds embodied for use in this invention may be prepared according to procedures outlined in the hereinbefore mentioned U.S. Pat. No. 2,556,150.

In illustration of the utility of this invention, d-beta-(4-methyl-$\Delta^3$-cyclohexenyl) butyraldehyde (I) and d-beta-(4-methyl-$\Delta^3$-cyclohexenyl) butanol (II) were subjected to tests for fungicidal activity according to the following test description. The results of said tests are set forth in the table following the description.

FUNGICIDE TESTING METHOD

Four representative soil fungi, *Fusarium oxysporium*, *Pythium debaryanum*, *Rhizoctonia solani*, and *Sclerotium rolfsii*, are maintained on potato dextrose agar in 20 x 150 mm. test tubes. Inoculum for the test is increased in a 1000 ml. Erlenmeyer flask on a ¼ corn meal-¾ sand mixture (by volume). The medium is saturated with water and sterilized by autoclaving at 15 lbs. pressure for 20 minutes on two successive days. The medium is inoculated by transferring, aseptically, a small portion of mycelium from the test tube cultures 14 days prior to using for inoculum.

An inoculated medium for each of the four soil organisms is prepared as follows: A 14-day old 1000 ml. flask of the corn meal-sand inoculum is used to inoculate 20 10-oz. cups of sterile soil by blending the inoculum and sterile soil for 10 minutes in the cement mixer.

The inoculated medium is then placed in 10-oz. wax treated cold drink cups (20 cups of each organism) and treated as follows: 150 mg. quantity of each candidate fungicide is weighed on the analytical balance and formulated using 10 ml. of acetone and 190 ml. of water. A 50 ml. quantity of each chemical formulation is used to drench 1 cup inoculated with each of the four fungal organisms. Immediately after the cups are drenched, they are placed in polyethylene bags (1 cup per bag) and held at 70° F. for fourteen days.

After ten days, each cup is examined for the presence of fungal growth and each compound rated for percent inhibition of fungal growth.

TABLE.—FUNGICIDAL ACTIVITY
[Percent effectiveness]

| Compound tested | Compound concentration, p.p.m.[1] | Fungus species contacted | | | |
|---|---|---|---|---|---|
| | | *Fusarium oxysporium* | *Pythium debaryanum* | *Rhizoctonia solani* | *Sclerotium rolfsii* |
| (I) | 50 | 90 | 80 | 90 | 90 |
|     | 20 | 43 | 10 | 13 | 13 |
| (II)| 50 | 50 | 20 | 80 | 80 |
|     | 20 | ...| 70 | 10 | 10 |

[1] Parts per million.

From the above data, it will be noted that the oxo-derivatives as embodied for use herein have a broad range of fungicidal activity. They are effective against *Fusarium oxysporium*, a fungus representing a huge genus of plant disease microorganisms; *Pythium debaryanum*, an important disease which causes decay, damping off and storage rot of cotton and many other plants; *Rhizoctonia solani* and *Sclerotium rolfsii*, complex disease microorganisms which cause damping off of practically all crops.

The compounds of this invention, in exhibiting considerable fungicidal activity are disclosed for use in various ways to achieve such utility. They can be applied per se as solids or in vaporized form, but are preferably applied as the toxic components in fungicidal compositions of the compound and a carrier. The compositions can be applied as dusts, as liquid sprays or as gas-propelled sprays and can contain, in addition to a carrier, additives such as emulsifying agents, wetting agents, binding agents, gases compressed to the liquid state, stabilizers and the like. A wide variety of liquid and solid carriers can be used in the fungicidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diatomaceous earth, pyrophyllite, fuller's earth, gypsum, flours derived from cottonseeds and nut shells, and various natural and synthetic clays having a pH not exceeding about 9.5.

The amount of the compounds of this invention utilized in fungicidal compositions will vary rather widely.

It depends to some extent upon the type of composition in which the material is being used, the nature of the condition to be controlled, and the method of application (i.e., spraying, dusting, etc.). In the ultimate fungicidal composition, as applied in the field, active compound concentrations as low as 0.001 weight percent of the total composition can be used. In general, compositions, as applied, containing about 0.05 weight percent active compoun din either liquid or solid carrier give excellent results. In some cases, however, stronger dosages up to about 10 weight percent may be required.

In practice, fungicidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application by dispersing it in water to obtain a sprayable suspension containing the concentration of active compound desired for application. Other concentrates can be solutions that can be later diluted, e.g., with kerosene. Thus it is within the contemplation of this invention to provide fungicidal compositions containing up to about 80 percent by weight of the composition of an active compound of this invention.

Accordingly, depending upon whether it is ready for application or it is in concentrated form, the contemplated fungicidal compositions contain between about 0.0001 percent and about 80 percent, by weight of the composition, of an active compound of this invention, and a carrier liquid or solid, as defined hereinbefore.

Although the present invention has been described with preferred embodiments, it is to be understood that modifications and variations may be resorted to without departing from the spirit and scope of this invention, as those skilled in the art will readily understand.

What is claimed is:

1. A method for killing fungi which comprises applying to said fungi a fungicidally effective amount of a compound having the formula:

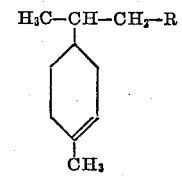

wherein R is a member seelcted from the group consisting of —CH$_2$OH and —CHO.

2. The method of claim 1, wherein R is —CH$_2$OH.
3. The method of claim 1, wherein R is —CHO.

References Cited
UNITED STATES PATENTS
2,556,150   6/1951   Wearn et al. _____ 260—488

ALBERT T. MEYERS, Primary Examiner

L. SCHENKMAN, Assistant Examiner

U.S. Cl. X.R.
424—343